United States Patent [19]

Hansz et al.

[11] Patent Number: 4,952,144
[45] Date of Patent: Aug. 28, 1990

[54] APPARATUS FOR IMPROVING QUALITY OF METAL OR CERAMIC POWDERS PRODUCED

[75] Inventors: Bernard Hansz, Vert le Petit; Michel Houdayer, Paris, both of France

[73] Assignee: Commissariat a l'Energie Atomique, Paris, France

[21] Appl. No.: 305,559

[22] Filed: Feb. 2, 1989

[30] Foreign Application Priority Data

Feb. 4, 1988 [FR] France .................. 88 01296

[51] Int. Cl.$^5$ .............................. B22F 9/08
[52] U.S. Cl. ................... 425/10; 148/143; 148/403; 264/5; 264/15
[58] Field of Search ............ 264/5, 14, 11, 12; 425/6, 7, 10; 75/0.5 B, 0.5 C; 148/403, 129, 143

[56] References Cited

U.S. PATENT DOCUMENTS

| | | | |
|---|---|---|---|
| 2,892,766 | 6/1959 | Broida | 204/164 |
| 3,451,910 | 6/1969 | Hellund | 204/168 |
| 3,510,291 | 5/1970 | Brush | 264/5 |
| 3,752,611 | 8/1973 | Reed et al. | 425/7 |
| 4,218,201 | 8/1980 | Kozima et al. | 425/7 |
| 4,309,214 | 1/1982 | Fourlard et al. | 75/0.5 B |
| 4,474,604 | 10/1984 | Nakamura et al. | 75/0.5 B |
| 4,509,995 | 4/1985 | Hachisu et al. | 148/143 |
| 4,647,305 | 3/1987 | Kumei et al. | 75/0.5 B |
| 4,687,510 | 8/1987 | Cheney et al. | 75/0.5 B |
| 4,734,451 | 3/1988 | Smith | 524/493 |
| 4,781,754 | 11/1988 | Soranno | 75/0.5 B |
| 4,793,853 | 12/1988 | Kale | 75/0.5 C |

FOREIGN PATENT DOCUMENTS

| | | | |
|---|---|---|---|
| 1398731 | 4/1965 | France | |
| 62-27507 | 2/1987 | Japan | 75/0.5 C |

OTHER PUBLICATIONS

NASA Tech Brief 4G, Apr. (1985), "Hollow Spheres of Metallic Glass".

*Primary Examiner*—Jay H. Woo
*Assistant Examiner*—K. P. Nguyen
*Attorney, Agent, or Firm*—Michael N. Meller

[57] ABSTRACT

An apparatus for forming ceramic or metal powders has a plasma generator, a source of material in the form of powder particles and a projection torch for passing the material through the plasma to melt the powder particles and then projecting a stream of plasma and material via an outlet. A container is provided for containing the projected stream. A plurality of spray diffusers are arranged to diffuse a spray of cryogenic liquid into a space through which the projected stream travels, whereby the projected stream is quenched. A console controls the flow rates of the powder particles and the plasma into the projection torch.

8 Claims, 2 Drawing Sheets

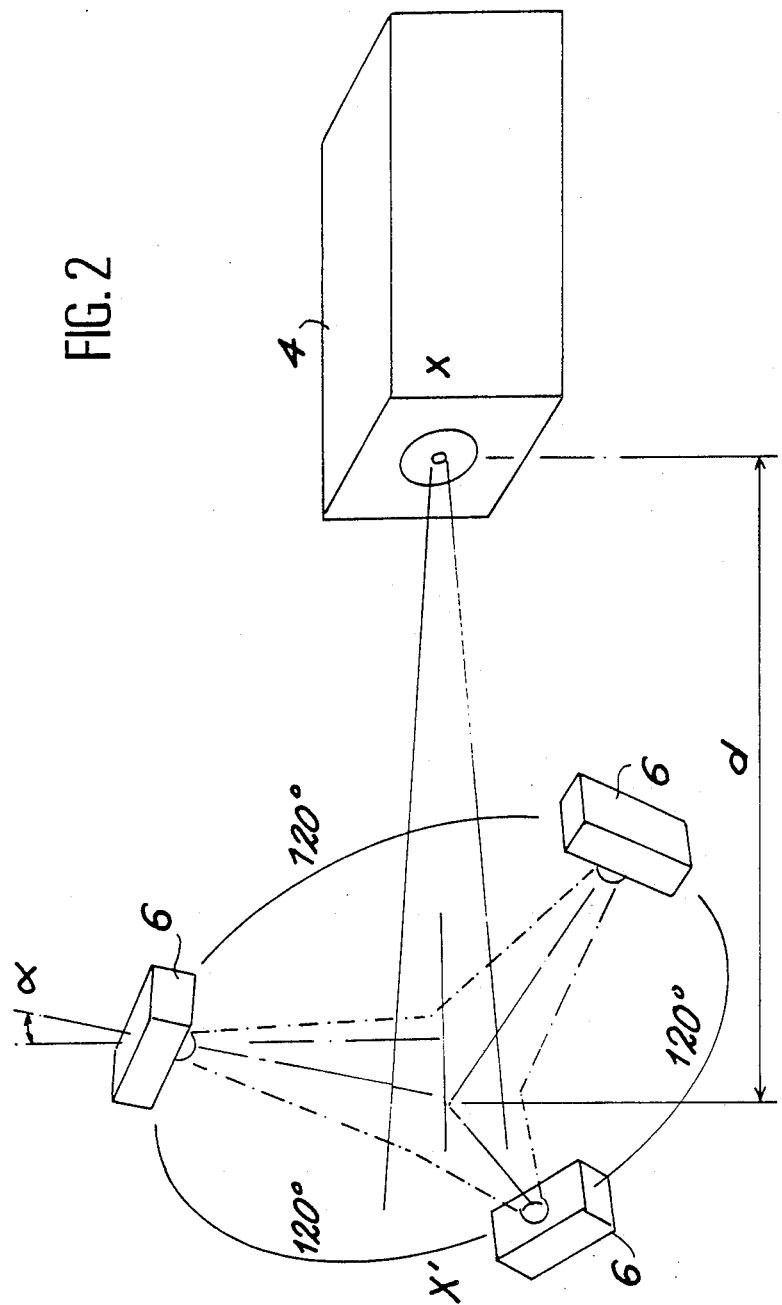

APPARATUS FOR IMPROVING QUALITY OF METAL OR CERAMIC POWDERS PRODUCED

FIELD OF THE INVENTION

The invention concerns the improvement of the quality of metal or ceramic powders and in particular the form of the particles, their specific surface area, their porosity and their absorbed gas content.

BACKGROUND OF THE INVENTION

The improvement of this type of powders can be effected in various ways. Firstly, it can be obtained at the time the powder is actually produced, this applying in particular to powders produced by the fusion of an ingot and followed by spraying. Another means to improve the quality of the powder consists of a baking operation once the powder has been obtained. Finally, welding torch treatment is often used to improve the quality of powders.

These treatments present the drawbacks of possibly incurring the risk of evolution of the powder when the latter is cooling and the risk of gas absorption. During a weld torch treatment, there exists a risk that the particles forming the powder may coalesce. Moreover, certain techniques for improving the chemical properties of fluidized bed treatment powders are extremely costly.

SUMMARY OF THE INVENTION

The object of the invention is to offer an apparatus for improving the quality of powders making it possible to overcome the aforesaid drawbacks, whilst seeking to obtain spherical particles with increased reactivity during their usage and chemically purified or modified.

To achieve this objective, a method is used to improve the quality of powders formed of particles by modifying the physical and chemical characteristics of the particles using at least one quenching and tempering treatment. It also consists of the following stages: passage of the powder to be treated into a plasma able to be reactive so as to have it subjected to a sudden and extremely high rise of temperature provoking an unstable state of the particles, this state being followed immediately by a passage in a cooling cone created by the spraying of a cryogenic fluid so as to impose on the particles of the powder an instantaneous quench hardening when the particles are still in an unstable state.

This method offers several advantages which are briefly the following: better spheroidizing of the particles improving the effectiveness of the powder when used, an improvement of the size grading of the powder and a purification of this powder by the elimination of the gases and impurities included inside the particles.

This method may be completed by a phase for recovering the particles of the powder according to several particle dimensions. According to the various implementations of the method, the cryogenic fluid may be argon or liquid helium.

According to several variants of this method, the plasma may appear in the form of a mixture produced according to the particles and impurities to be treated in the powder.

The main object of the invention is to provide an apparatus for implementing said method. It essentially includes a projection containment in which is placed a projection torch containing the plasma and powder and cryogenic liquid spray diffusers for diffusing the cryogenic fluid, these diffusers being placed at the outlet of the projection torch. It also uses a plasma generator, a cryogenic liquid container and a console for controlling the projection torch. One of the main advantages of such an apparatus is that it can be stopped or started at any moment, which is not to the case with the prior art methods mentioned above.

In order to recover the powders, the apparatus according to the invention may include a first pot for the gravity recovery of heavy particles and placed at the outlet of the projection containment, and a partial vacuum cyclone dust catcher for separating the average-sized particles, which fall via gravity, and the very fine particles which are driven by a flow of air.

It may be possible to place a temperature control device inside the containment.

Three diffusers are preferably used which are slightly inclined with respect to the plane perpendicular to the general displacement direction of the particles.

BRIEF DESCRIPTION OF THE DRAWINGS

The invention and its various technical characteristics shall be more readily understood from a reading of the following description with reference to the annexed figures in which:

FIG. 2 shows a more detailed diagram of the projection torch and the cryogenic liquid spray diffusers used in the apparatus according to the invention.

SUMMARY OF THE INVENTION

Figure 1:
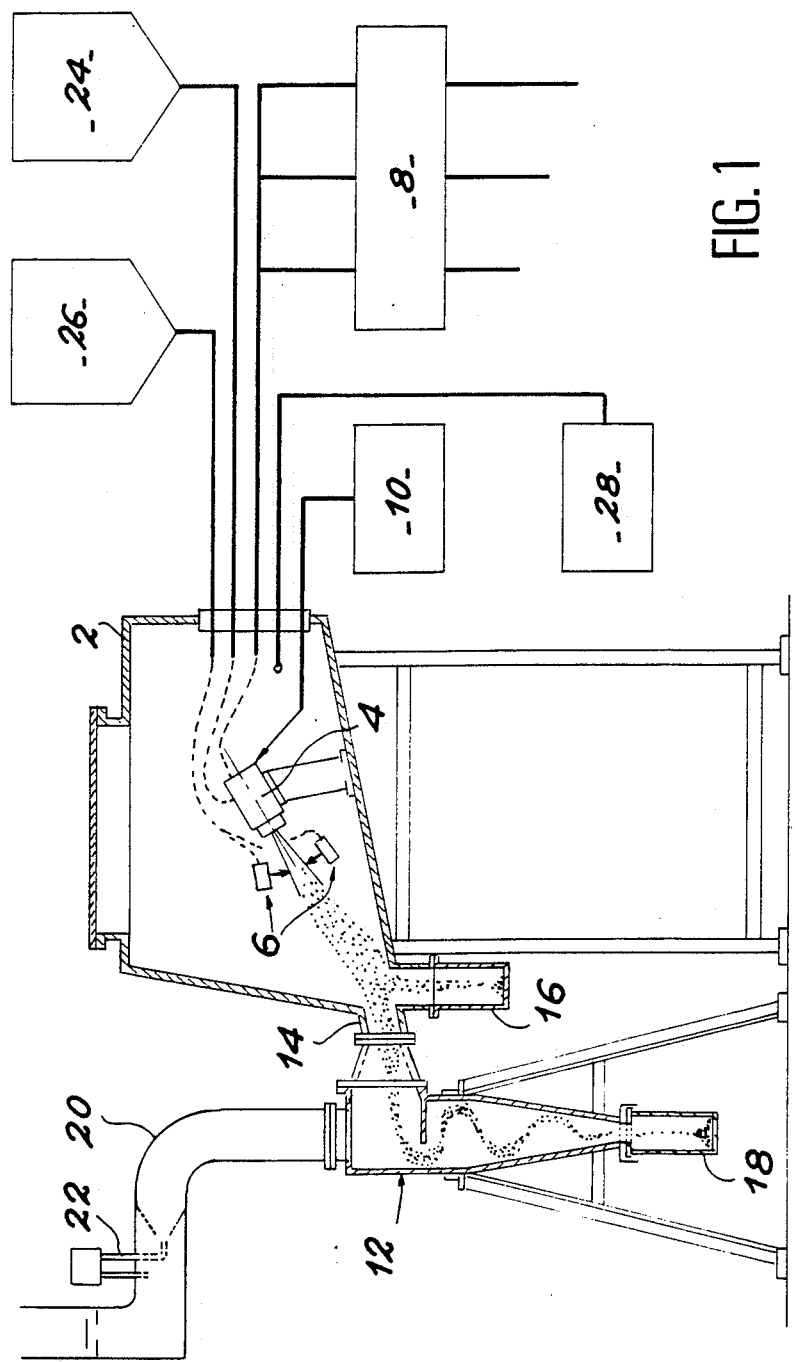
FIG. 1 shows a diagram of the apparatus according to the invention.

The principle according to the invention consists of improving the quality of the powder by modifying the chemical and physical characteristics of the particles forming this powder by using two quenching and hardening treatments. It consists more particularly of passing the powder to be treated into a plasma able to be reactive. In this way, the powder undergoes a very high and sudden rise of temperature. For example, this rise of temperature may be about 20,000° C. over a time of about one millisecond. It is then followed by a partial volatilization of the particle which then assumes an unstable state. The principle also consists of subjecting each particle to a sudden quench hardening immediately after its passage in the plasma whilst said particle is still in the unstable state. The quench hardening is performed by the atomization of a cryogenic fluid at the outlet of the passage of the particles of the powder in the plasma. This quench hardening is carried out for a period of about one microsecond. The quench hardening of the particles, still in an unstable state, is thus instantaneous.

The sudden temperature rise obtained via plasma passage causes the particles to melt, thereby eliminating any impurities it may contain. These may be from the occluded gas, oxides or any volatile or solid impurities. This method of heating also makes it possible to provoke any chemical reactions according to the composition of the plasma used. The fast quenching operation effected by cooling using a cryogenic fluid allows for the new characteristics of the particles of the powder to be established at the passage outlet in the plasma.

FIG. 1 mainly shows at the center a projection containment 2 in which is disposed a projection torch 4 containing the plasma and powder and cryogenic liquid spray diffusers 6 placed at the outlet of the projection torch 4. These principal elements shall be described later in detail.

So as to complete the apparatus and the principle according to the invention, provision has made been to recover the powder according to several particle dimensions in order to sort them and free them from dust. To this effect, a first pot 16 to recover by gravity the heaviest particles is placed at the outlet 14 of the containment 2. In fact, since the displacement speed of the particles at the outlet of the torch is about 500 meters per second, by determinedly placing such a recovery pot 16 below the inlet 14 of the containment 2 with respect to the trajectory of the particles, it is possible to recover by gravity the heaviest particles. Recovery may be extended by a cyclone dust catcher 12 placed after the outlet 14 of the containment 2. The dust catcher provokes a partial vacuum by a vertical flow of swirling air, thus projecting the lightest particles at the top of the dust cyclone dust catcher, the heavier particles tending to fall via the effect of gravity. A second pot 18 is then placed below the cyclone dust catcher 12 so as to recover the heavier particles. A recovery tube 20 is placed at the top of the cyclone dust catcher 12 in order to recover the finest particles. This tube may comprise a Pitot tube 22 enabling the speed of the air flow in recovery tube 20 to be measured.

In order to complete this installation, a console 10 is used to control the projection torch and a plasma generator 8. It is also essential to use a first container 26 containing the cryogenic liquid and a second container 24 containing the powder to be treated.

The projection torch 4 may be fed by a "TWIN" distributor, the plasma generator possibly being a "Plasmatechnik" generator with a "Plasmatechnik" control console making it possible to adjust the flow rate of the powder and the flow rate of the gas. The cryogenic liquid spray diffusers 6 may be "EMANI ¼" diffusers.

FIG. 2 shows more clearly the position of the cryogenic liquid spray diffusers 6 with respect to the projection torch 4. Where three diffusers are used, these are placed at an angle of 120° in relation to each other around an axis XX' symbolizing the trajectory of the powder particles leaving the projection torch 4. In order to give an order of magnitude of this embodiment, the diffusers 6 are placed at a distance d equal to about 100 mm from the torch 4 along the axis XX'. They are placed at radial distances equidistant from axis XX'. Preferably, the diffusers are inclined at an angle of about ten degrees with respect to a plane perpendicular to axis XX'. This inclination is such that the diffusers are inclined towards the front with respect to the progression of the particles of the powder. According to the possible various embodiments, the angle may also vary between 5° and 60°.

It is also possible to use a device 28 (see FIG. 1) for controlling the ambient temperature inside the containment 2.

According to the various particles to be treated and any impurities these contain, it is possible to modulate the plasma mixture. Thus, in addition to the sudden rise of temperature, it is possible to obtain by means of the plasma a partial oxidation or a carbonizing, or even an additional chemical reaction during the same operation.

One of the main advantages of the invention is obtaining good spheroidizing of the particles constituting the powder. This makes it possible to improve heat transfers and movement quantity transfers and provides better pourability of the powder, which is extremely important when the latter is used for sintering. Owing to the obtaining of good spheroidizing, each particle has a virtually minimum specific surface area.

A further advantage of the invention is an improvement of the size grading of the powder treated in this way, namely an improvement of the uniformity of the size of the particles.

On the other hand, the invention allows for the elimination of occluded gases inside the particles or any oxides or impurities the particles may contain. The risks of these particles bursting due to the presence of this foreign matter are thus significantly reduced.

Moreover, at the time of sintering the treated powder, the evaporation-condensation flow mechanisms are improved.

The method of the invention also makes it possible to obtain amorphous powders, namely those without any crystalline structure. It is also possible to obtain powders with particular chemical characteristics by the use of the reactive nature of the plasma.

The installation described in this text is extremely easy to use, since it merely involves adjusting and controlling the functioning of the projection torch and the cryogenic liquid spray diffusers, which controls can be combined. As this equipment uses plasma heating and cryogenic cooling liquid means, this makes it possible to carry out frequent stops and starts that require hardly any preparation. The operator may stop or start the mechanism at any time he chooses.

What is claimed is:

1. An apparatus for forming powder comprising:
   means for generating a plasma including a plasma torch and means for delivering a gas to said torch;
   a source of material in the form of powder particles;
   projecting means coupled to said plasma generating means and said source of material for passing said material through said plasma to melt said powder particles and then projecting a stream of said plasma and said material via an outlet;
   means for containing said projected stream;
   a source of liquid coolant;
   means located within said containing means and coupled to said source of liquid coolant for diffusing a spray of said liquid coolant, said spray diffusing means being positioned to direct said cooling spray into a space through which said projected stream travels, whereby said projected stream is quenched by said cooling spray; and
   means for controlling the flow rates of said powder particles and said gas passing into said projecting means.

2. The apparatus as defined in claim 1, wherein said containing means comprises an outlet, said apparatus further comprising a first pot for recovering the heaviest particles from said quenched stream by gravity, said first pot being located below said outlet of said containing means, a cyclone dust catcher for separating via a partial vacuum the fine particles in said stream from the other particles remaining after removal of said heaviest particles, a second pot for recovering said other particles by gravity, and a recovery tube for recovering said fine particles entrained in a flow of air produced by said partial vacuum.

3. The apparatus as defined in claim 1, wherein said liquid coolant is cryogenic liquid.

4. The apparatus as defined in claim 1, wherein said material is a metal.

5. The apparatus as defined in claim 1, wherein said material is ceramic.

6. The apparatus as defined in claim 1, further comprising means for controlling the temperature inside said containing means.

7. The apparatus as defined in claim 1, wherein said spray diffusing means comprises a plurality of spray diffusers arranged in a plane substantially perpendicular to said axis, said spray diffusers being located at equal radial distances from said axis and being circumferentially distributed at equal angles.

8. The apparatus as defined in claim 7, wherein each of said spray diffusers is inclined relative to said plane.

* * * * *